(12) United States Patent
Line et al.

(10) Patent No.: US 12,030,409 B2
(45) Date of Patent: Jul. 9, 2024

(54) SEATING ASSEMBLY WITH SWIVEL CAPABILITY

(71) Applicant: Ford Global Technologies, LLC, Dearborn, MI (US)

(72) Inventors: Johnathan Andrew Line, Northville, MI (US); Macit Aktas, Windsor (CA); Joseph Michael Kish, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/699,996

(22) Filed: Mar. 21, 2022

(65) Prior Publication Data
US 2023/0294570 A1 Sep. 21, 2023

(51) Int. Cl.
*B60N 2/14* (2006.01)

(52) U.S. Cl.
CPC ..................................... *B60N 2/14* (2013.01)

(58) Field of Classification Search
CPC ....................................................... B60N 2/14
See application file for complete search history.

(56) References Cited

U.S. PATENT DOCUMENTS

| | | |
|---|---|---|
| 2,696,774 A | 12/1954 | Bayley |
| 5,832,555 A | 11/1998 | Saucier et al. |
| 6,179,545 B1 | 1/2001 | Petersen, Jr. et al. |
| 6,536,842 B2 | 3/2003 | Bowers et al. |
| 7,850,242 B2 * | 12/2010 | Taguchi ................ B60N 2/146 |
| | | 297/344.23 |
| 8,061,675 B2 | 11/2011 | Downey |
| 9,004,993 B2 | 4/2015 | Fujii et al. |
| 9,233,791 B2 | 1/2016 | Bushnell et al. |
| 9,271,883 B2 | 3/2016 | Johnson et al. |
| 9,670,013 B2 | 6/2017 | Parrish |
| 10,369,865 B2 | 8/2019 | Perkins |
| 10,688,889 B2 | 6/2020 | Feng et al. |
| 10,807,504 B2 * | 10/2020 | Line ..................... B60N 2/0292 |
| 10,857,913 B2 * | 12/2020 | Dry ...................... B60N 2/0276 |
| 10,919,428 B2 | 2/2021 | Wallace et al. |
| 10,926,669 B2 * | 2/2021 | Aktas ....................... B60N 2/14 |
| 10,946,776 B2 * | 3/2021 | Kish .................... B60N 2/0232 |
| 10,981,430 B2 | 4/2021 | Jeong |
| 2010/0253123 A1 * | 10/2010 | DeCraene ............. B60N 2/062 |
| | | 297/344.21 |
| 2013/0252529 A1 | 9/2013 | Baldsiefen et al. |

(Continued)

FOREIGN PATENT DOCUMENTS

| | | |
|---|---|---|
| EP | 3251894 A1 | 6/2017 |
| JP | 5081661 B2 | 11/2012 |
| JP | 2020047174 A | 3/2020 |

*Primary Examiner* — Philip F Gabler
(74) *Attorney, Agent, or Firm* — Vichit Chea; Price Heneveld LLP

(57) ABSTRACT

A seating assembly includes a coupling member, a seat, a seatback, a swivel plate, and a base. The seat is pivotably coupled to the coupling member. The seatback is pivotably coupled to the coupling member. The swivel plate is coupled to the coupling member. The swivel plate includes a plurality of swivel anchors. The base is coupled to the swivel plate. The swivel plate enables rotational movement of the coupling member, the seat, the seatback, and the swivel plate about a vertical axis. The base includes a plurality of base anchors. The plurality of base anchors receive the plurality of swivel anchors.

19 Claims, 9 Drawing Sheets

(56) References Cited

U.S. PATENT DOCUMENTS

2019/0381858 A1 12/2019 Sadowski et al.
2019/0382224 A1 12/2019 Vollmar et al.
2020/0086769 A1* 3/2020 Aktas .................. B60N 2/06
2020/0406787 A1 12/2020 Line et al.
2020/0406789 A1 12/2020 Line et al.
2021/0053416 A1 2/2021 Suzuki et al.

* cited by examiner

SEATING ASSEMBLY WITH SWIVEL CAPABILITY

FIELD OF THE DISCLOSURE

The present disclosure generally relates to a seating assembly. More specifically, the present disclosure relates to a seating assembly with swivel capability.

BACKGROUND OF THE DISCLOSURE

Vehicles are often provided with one or more seating assemblies. Seating solutions provided within a passenger compartment of a vehicle can be a deciding factor in consumers purchase decisions.

SUMMARY OF THE DISCLOSURE

According to a first aspect of the present disclosure, a seating assembly includes a coupling member, a seat, a seatback, a swivel plate, and a base. The seat is pivotably coupled to the coupling member. The seatback is pivotably coupled to the coupling member. The swivel plate is coupled to the coupling member. The swivel plate includes a plurality of swivel anchors. The base is coupled to the swivel plate. The swivel plate enables rotational movement of the coupling member, the seat, the seatback, and the swivel plate about a vertical axis. The base includes a plurality of base anchors. The plurality of base anchors receive the plurality of swivel anchors.

Embodiments of the first aspect of the disclosure can include any one or a combination of the following features:
  wherein each of the plurality of swivel anchors is received in one of the plurality of base anchors when the seating assembly is in a forward-facing position;
  each of the plurality of swivel anchors is received in one of the plurality of base anchors when the seating assembly is in a rearward-facing position;
  a surface area of overlap between the plurality of swivel anchors and the plurality of base anchors is greater in the forward-facing position than a side-facing position;
  the surface area of overlap between the plurality of swivel anchors and the plurality of base anchors is greater in the rearward-facing position than the side-facing position;
  the plurality of swivel anchors are free of engagement with the plurality of base anchors when the seating assembly is in the side-facing position;
  when the seating assembly is in a diagonally-oriented position, a first diagonal pair of the plurality of swivel anchors is engaged with a first diagonal pair of the plurality of base anchors;
  when the seating assembly is in the diagonally-oriented position, a second diagonal pair of the plurality of swivel anchors is disengaged with a second diagonal pair of the plurality of base anchors;
  the diagonally-oriented position is at least one intermediate position chosen from between the forward-facing position and the side-facing position and between the rearward-facing position and the side-facing position;
  the base includes a first leg, a second leg, a third leg, and a fourth leg;
  the first leg, the second leg, the third leg, and the fourth leg each include a terminal end, wherein the terminal ends of the first leg, the second leg, the third leg, and the fourth leg are each configured for engagement with at least one track assembly;
  the at least one track assembly includes a first track assembly and a second track assembly, wherein the terminal ends of the first leg and the second leg are configured for engagement with the first track assembly, and wherein the terminal ends of the third leg and the fourth leg are configured for engagement with the second track assembly; and
  the base has a profile that is generally X-shaped.

According to a second aspect of the present disclosure, a seating assembly includes a coupling member, a seat, a seatback, a swivel plate, and a base. The seat is pivotably coupled to the coupling member. The seatback is pivotably coupled to the coupling member. The swivel plate is coupled to the coupling member. The swivel plate includes a plurality of swivel anchors. The base is coupled to the swivel plate. The swivel plate enables rotational movement of the coupling member, the seat, the seatback, and the swivel plate about a vertical axis. The base includes a plurality of base anchors. The plurality of base anchors receive the plurality of swivel anchors. Each of the plurality of swivel anchors is received in one of the plurality of base anchors when the seating assembly is in a forward-facing position. Each of the plurality of swivel anchors is received in one of the plurality of base anchors when the seating assembly is in a rearward-facing position. A surface area of overlap between the plurality of swivel anchors and the plurality of base anchors is greater in the forward-facing position than a side-facing position. The surface area of overlap between the plurality of swivel anchors and the plurality of base anchors is also greater in the rearward-facing position than the side-facing position.

Embodiments of the second aspect of the present disclosure can include any one or a combination of the following features:
  the plurality of swivel anchors are free of engagement with the plurality of base anchors when the seating assembly is in the side-facing position;
  when the seating assembly is in a diagonally-oriented position, a first diagonal pair of the plurality of swivel anchors is engaged with a first diagonal pair of the plurality of base anchors, wherein, when the seating assembly is in the diagonally-oriented position, a second diagonal pair of the plurality of swivel anchors is disengaged with a second diagonal pair of the plurality of base anchors, wherein the diagonally-oriented position is at least one intermediate position chosen from between the forward-facing position and the side-facing position and between the rearward-facing position and the side-facing position;
  the base includes a first leg, a second leg, a third leg, and a fourth leg;
  the base has a profile that is generally X-shaped;
  the first leg, the second leg, the third leg, and the fourth leg each include a terminal end, wherein the terminal ends of the first leg, the second leg, the third leg, and the fourth leg are each configured for engagement with at least one track assembly; and
  the at least one track assembly includes a first track assembly and a second track assembly, wherein the terminal ends of the first leg and the second leg are configured for engagement with the first track assembly, and wherein the terminal ends of the third leg and the fourth leg are configured for engagement with the second track assembly.

These and other aspects, objects, and features of the present disclosure will be understood and appreciated by

DETAILED DESCRIPTION OF THE PREFERRED EMBODIMENTS

Figure 1:
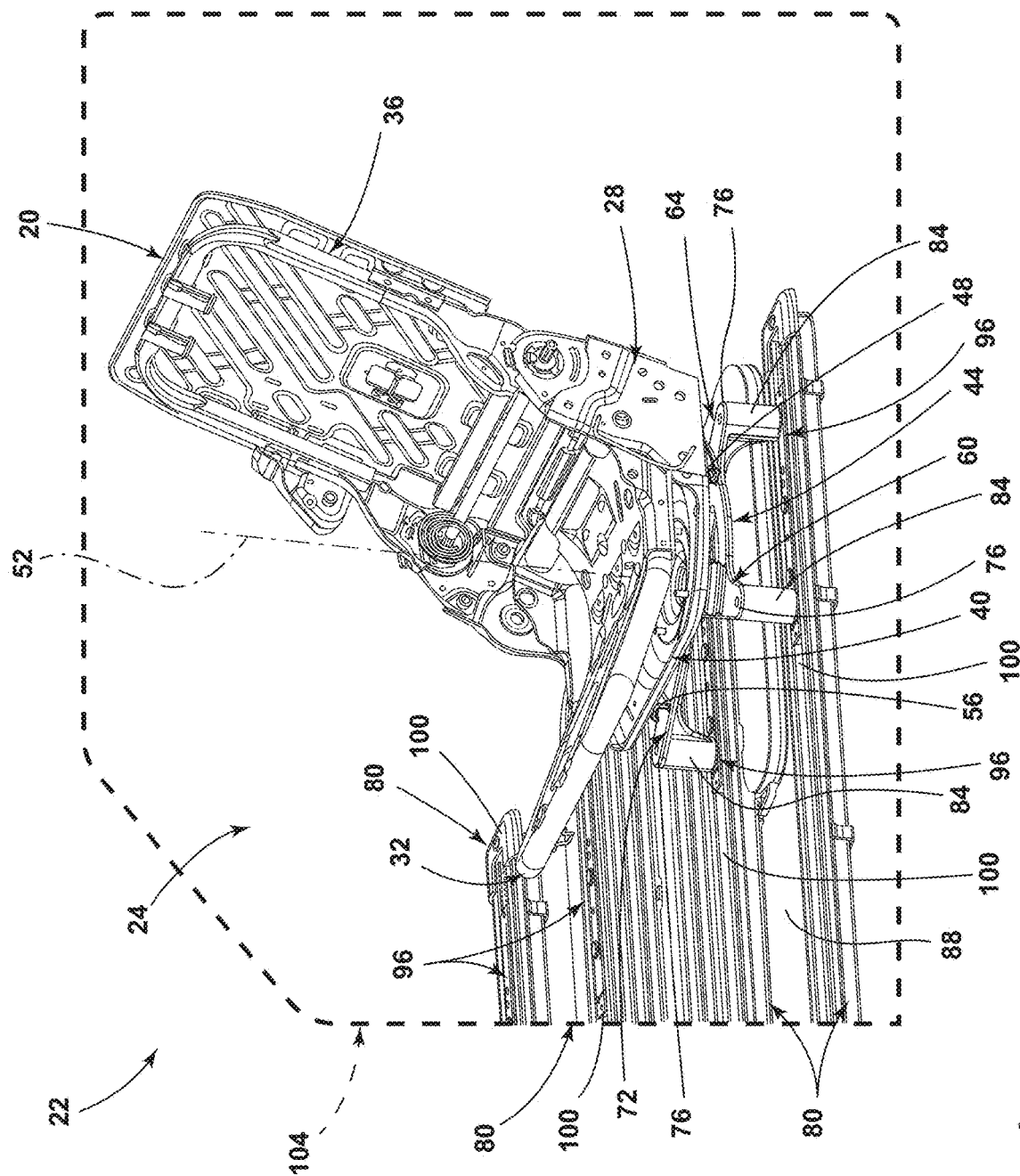
FIG. 1 is a side perspective view of a passenger compartment of a vehicle, illustrating a seating assembly positioned therein, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-9, reference numeral 20 generally designates a seating assembly. The seating assembly 20 may be positioned within a vehicle 22. For example, the seating assembly 20 may be positioned within a passenger compartment 24 of the vehicle 22. The vehicle 22 may be a motor vehicle. For example, the vehicle 22 may be a land-based vehicle (e.g., an automobile, a motorcycle, a train, etc.), an air-based vehicle (e.g., an airplane, a helicopter, etc.), and/or a water-based vehicle (e.g., a boat or other watercraft). While the vehicle 22 may be a motor vehicle, the present disclosure is not limited to internal combustion engines as a source of locomotive power for the vehicle 22. Rather, alternative sources may be utilized in providing locomotive power to the vehicle 22. For example, locomotive power may be provided to the vehicle 22 by electric motors, fuel cells, and/or petroleum-based fuel engines. According to various examples, the vehicle 22 may be driver-controlled, semi-autonomous, fully-autonomous, or any combination of user-controlled and automated. For example, the semi-autonomous example of the vehicle 22 may perform many, or all, commuting functions (e.g., accelerating, braking, turning, signaling, etc.) independent of user interaction while the user maintains override control of the vehicle 22.

Referring again to FIGS. 1-9, the seating assembly 20 includes a coupling member 28, a seat 32, a seatback 36, a swivel plate 40, and a base 44. The seat 32 is pivotably coupled to the coupling member 28. The seatback 36 is also pivotably coupled to the coupling member 28. The swivel plate 40 is coupled to the coupling member 28. The swivel plate 40 includes a plurality of swivel anchors 48. The base 44 is coupled to the swivel plate 40. The swivel plate 40 enables rotational movement of the coupling member 28, the seat 32, the seatback 36, and the swivel plate 40 about a vertical axis 52. While the swivel plate 40 allows for different seating orientations, modern OEMs of passenger vehicles would currently warn against employing some alternative uses for the passenger compartment 24 while the vehicle 20 is in motion; however it is anticipated that technology and the regulatory framework may evolve in the future to where such an activity is safe and permissible. The base 44 includes a plurality of base anchors 56. The plurality of base anchors 56 receive the plurality of swivel anchors 48.

Figure 2:
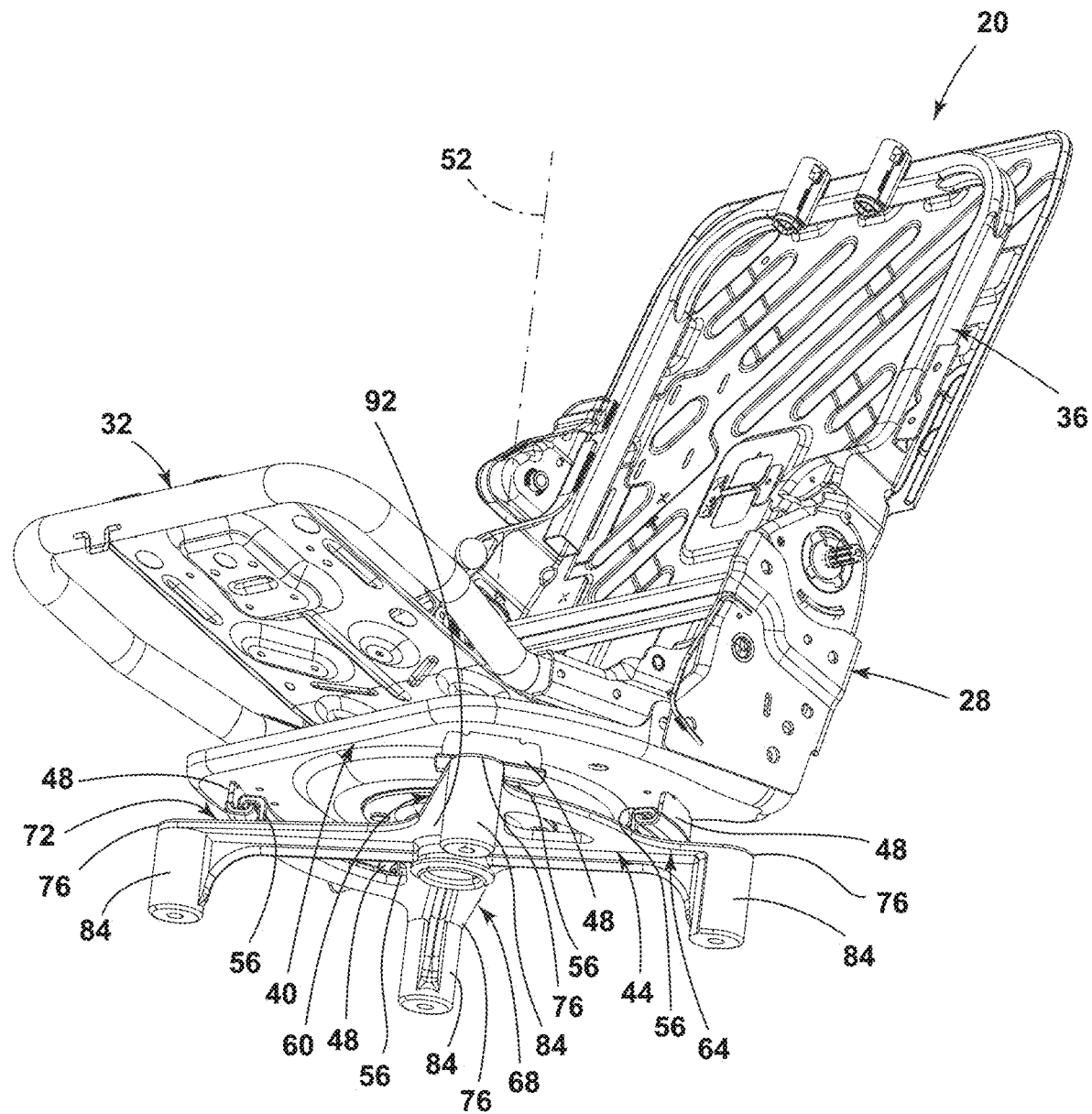
FIG. 2 is a bottom perspective view of the seating assembly, illustrating a base and swivel plate of the seating assembly, according to one example.

Referring now to FIGS. 1 and 2, the base 44 may include a first leg 60, a second leg 64, a third leg 68, and a fourth leg 72. The first leg 60, the second leg 64, the third leg 68, and the fourth leg 72, each include a terminal end 76. The terminal ends 76 may be furthest from a center point of the base 44, where the center point of the base 44 is a geometric center of the base 44 and/or a point through which the vertical axis 52 extends. The terminal ends 76 of the first leg 60, the second leg 64, the third leg 68, and the fourth leg 72, may each be configured for engagement with at least one track assembly 80. For example, the at least one track assembly 80 can include a first track assembly (e.g., a left track assembly) and a second track assembly (e.g., a right track assembly). The terminal ends 76 of the first leg 60 and the second leg 64 can be configured for engagement with the first track assembly. The terminal ends 76 of the third leg 68 and the fourth leg 72 can be configured for engagement with the second track assembly. For example, the terminal ends 76 of the first leg 60, the second leg 64, the third leg 68, and the fourth leg 72 may each be provided with a foot 84 that extends downwardly from the corresponding leg toward the corresponding one of the track assemblies 80. A height may be the same for each foot 84. The height of the foot 84 may be chosen to provide a degree of clearance between a floor 88 of the passenger compartment 24 and an underside of the seating assembly 20 (e.g., an underside of a central portion 92 of the base 44).

Referring again to FIGS. 1 and 2, in various examples, the base 44 may have a profile that is generally X-shaped. In various examples, each of the track assemblies 80 may have a length that is at least about 25% of a length of the passenger compartment 24. For example, the length of the track assemblies 80 may be at least about 25%, at least about 30%, at least about 35%, at least about 40%, at least about 45%, at least about 50%, and/or combinations or ranges thereof, of a longitudinal length of the passenger compartment 24. Accordingly, the track assemblies 80 may be of a sufficient length that the seating assemblies 20 coupled thereto may be transitioned between various rows of seating assemblies (e.g., a first row, a second row, and/or a third row). Each of the track assemblies 80 may be provided with at least one carriage assembly 96. The carriage assemblies 96 can be received within channels 100 that are defined by each track assembly 80. The carriage assemblies 96 are configured for actuation along the channel 100 of the corresponding track assembly 80. Additionally, the carriage assemblies 96 are configured to couple with the foot 84 of at least two of the legs chosen from the first leg 60, the second leg 64, the third leg 68, and the fourth leg 72. Said another way, the first leg 60 and the second leg 64 may correspond with a first carriage assembly 96 positioned within a first track assembly 80, while the third leg 68 and the fourth leg 72 correspond with a second carriage assembly 96 that is within a second track assembly 80.

Referring further to FIGS. 1 and 2, the coupling between the carriage assembly 96 and the base 44 may be accomplished by way of the foot 84 of the corresponding first, second, third, and/or fourth legs 60, 64, 68, 72. For example, the carriage assembly 96 may be fixedly coupled with the foot 84 of a first pair of the legs chosen from the first leg 60, the second leg 64, the third leg 68, and the fourth leg 72. The fixed coupling between the carriage assembly 96 and the corresponding foot 84 of the legs may be a removable coupling (e.g., by way of a bolt). Regardless of the particular coupling between the given foot 84 of corresponding legs chosen from the first leg 60, the second leg 64, the third leg 68, and the fourth leg 72, the base 44 may not be movable relative to the carriage assemblies 96 that are associated with the given base 44. Said another way, actuation of the base 44 or the carriage assembly 96 along the track assembly 80 will result in a corresponding actuation of the other of the carriage assembly 96 and the base 44. While the base 44 may be immovable relative to the carriage assemblies 96, the swivel plate 40, the seatback 36, the seat 32, and the coupling member 28, may be movable relative to the carriage assemblies 96 (e.g., rotational motion about a horizontal axis or the vertical axis 52), as will be discussed in further detail herein.

Figure 3:
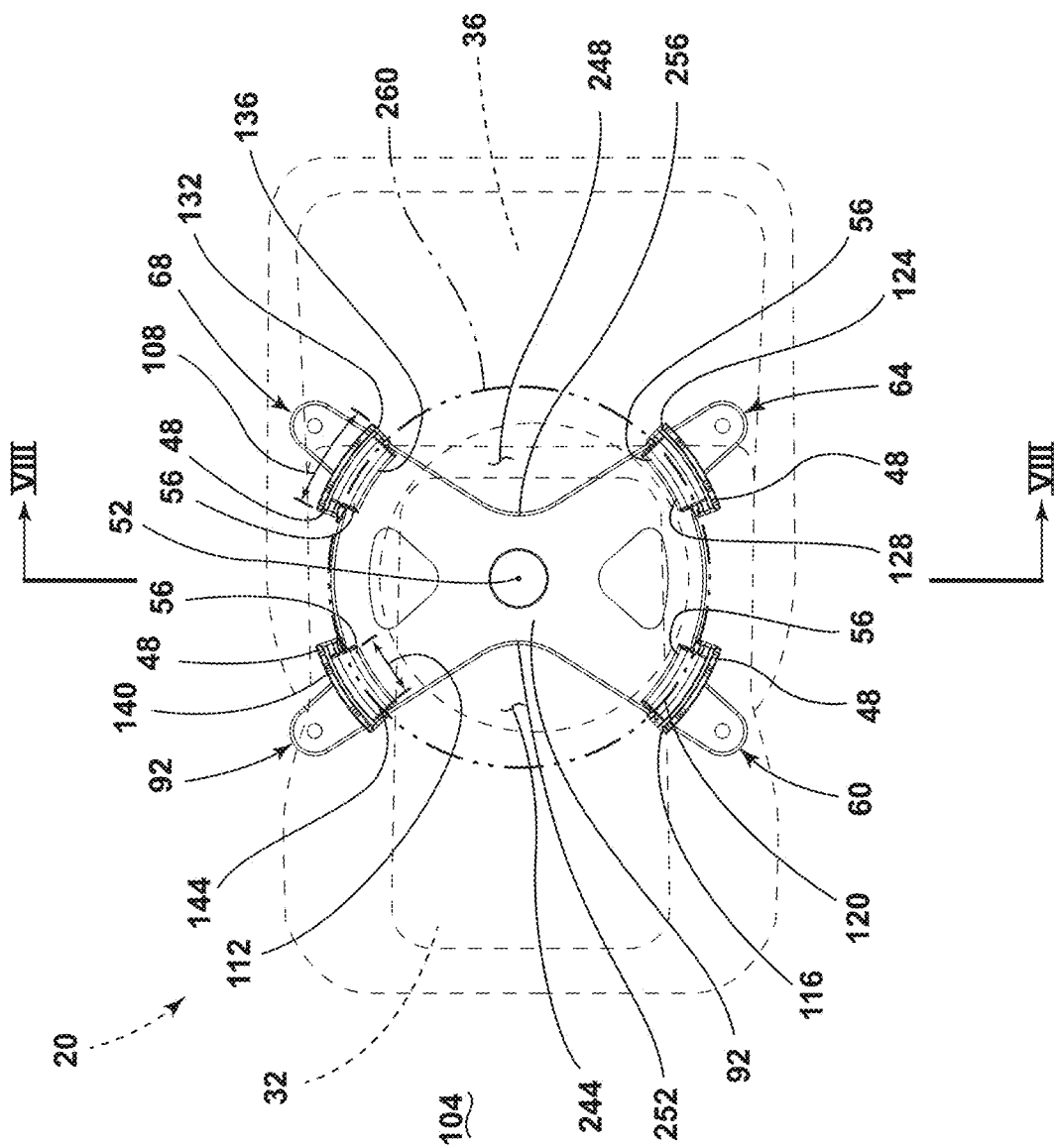
FIG. 3 is a top schematic view of the seating assembly, illustrating an interaction between swivel anchors and base anchors when the seating assembly is in a forward-facing position, according to one example.
Figure 4:
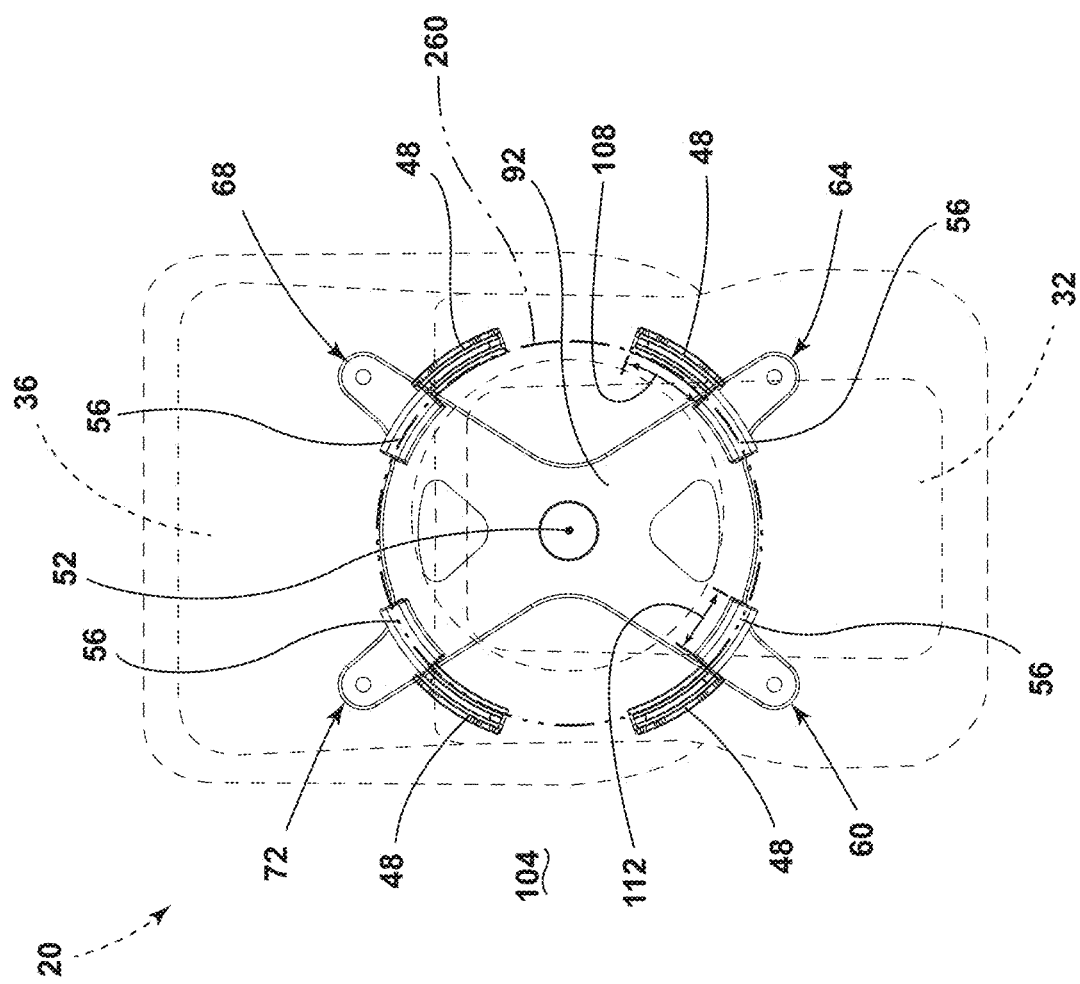
FIG. 4 is a top schematic view of the seating assembly, illustrating an interaction between the swivel anchors and the base anchors when the seating assembly is in a side-facing position, according to one example.
Figure 5:
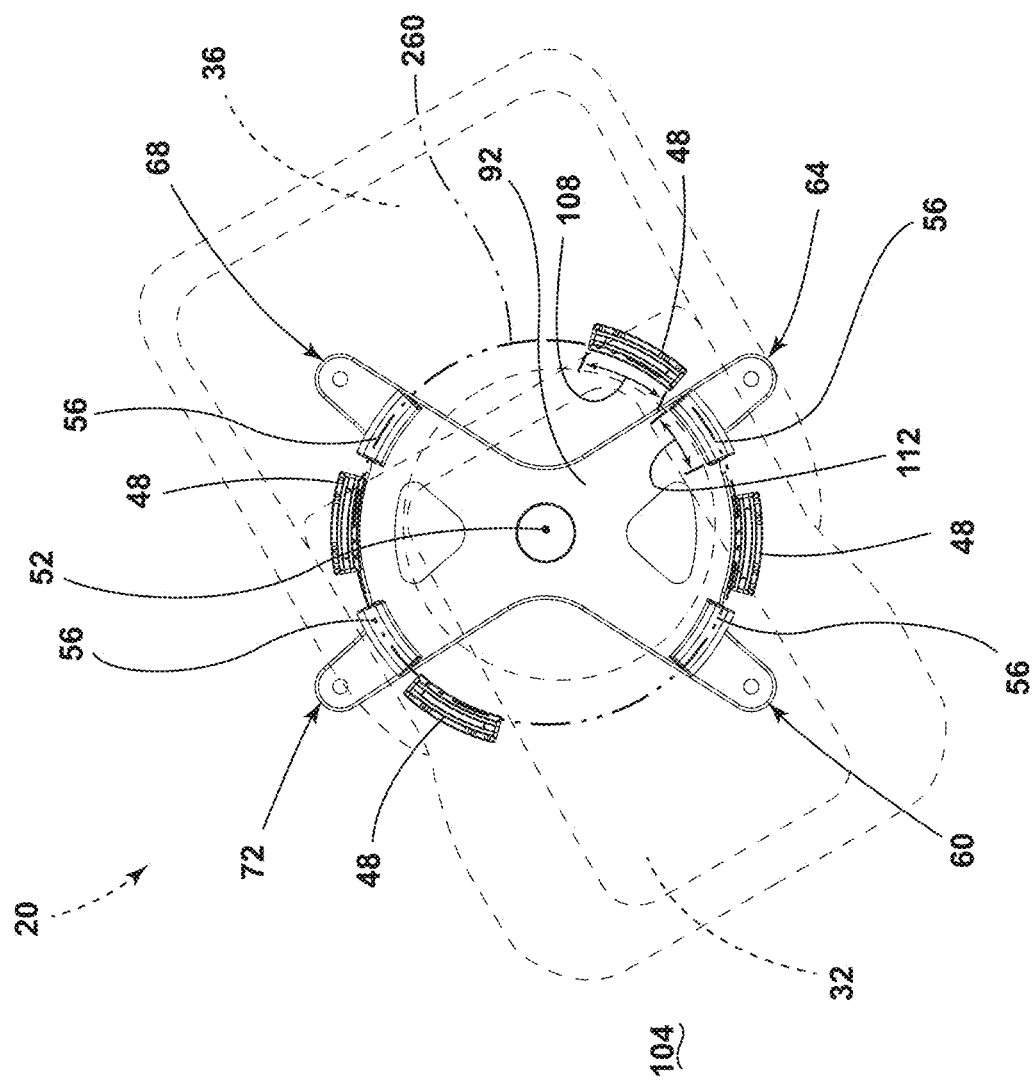
FIG. 5 is a top schematic view of the seating assembly, illustrating an interaction between the swivel anchors and the base anchors when the seating assembly is in a first diagonally-oriented position, according to one example.

Referring to FIGS. 3-6, each of the plurality of swivel anchors 48 is received in one of the plurality of base anchors 56 when the seating assembly 20 is in a forward-facing position (FIG. 3). Similarly, each of the plurality of swivel anchors 48 may be received within one of the plurality of base anchors 56 when the seating assembly 20 is in a rearward-facing position. In the position of the seating assembly 20 depicted in FIG. 3, the seat 32 and the seatback 36 are oriented toward a front 104 of the vehicle 22 to which the seating assembly 20 is coupled. In the forward-facing position and/or the rearward-facing position, a surface area of overlap between the plurality of swivel anchors 48 and the plurality of base anchors 56 may be maximized. For example, a length 108 of the swivel anchor 48 may be greater than a length 112 of the base anchor 56. The length 108 of the swivel anchor 48 and the length 112 of the base anchor 56 may be referred to as arc lengths. As used herein, the term arc length is intended to refer to a section of a circumference of a circle that corresponds to a given length along that circumference of that circle. Accordingly, the swivel anchors 48 and the base anchors 56 may be curved or arcuate. The swivel anchors 48 and the base anchors 56 are configured in a mating relationship, as will be discussed further herein.

Referring again to FIGS. 3-6, the surface area of overlap between the plurality of swivel anchors 48 and the plurality of base anchors 56 may be greater in the forward-facing position than a side-facing position (FIG. 4). Additionally, or alternatively, the surface area of overlap between the plurality of swivel anchors 48 and the plurality of base anchors 56 may be greater in the rearward-facing position than the side-facing position. The surface area of overlap between the swivel anchors 48 and the base anchors 56 when the seating assembly 20 is in the side-facing position may be very small, however, a surface area of overlap between each of the swivel anchors 48 and the base anchors 56 may remain. In some examples, the plurality of swivel anchors 48 may be free of engagement with the plurality of base anchors 56 when the seating assembly 20 is in the side-facing position. The side-facing position of the seating assembly 20 may be rotationally displaced from the forward-facing position and/or the rearward-facing position by about ninety degrees (90°).

Referring further to FIGS. 3-6, rotational positions of the seating assembly 20 that are between the forward-facing position and the side-facing position, or between the rearward-facing position and the side-facing position, may be referred to as diagonally-oriented positions. In some diagonally-oriented positions, such as that depicted in FIG. 5, the plurality of swivel anchors 48 and the plurality of base anchors 56 may be entirely disengaged from one another. Said another way, the surface area of overlap between the swivel anchors 48 and the base anchors 56, when in some diagonally-oriented positions, may be zero or non-existent. In the diagonally-oriented position depicted in FIG. 5, the seating assembly 20 is displaced from the forward-facing position by rotation of the seating assembly 20 about the vertical axis 52 by approximately thirty degrees (30°) in a counterclockwise direction.

Figure 6:
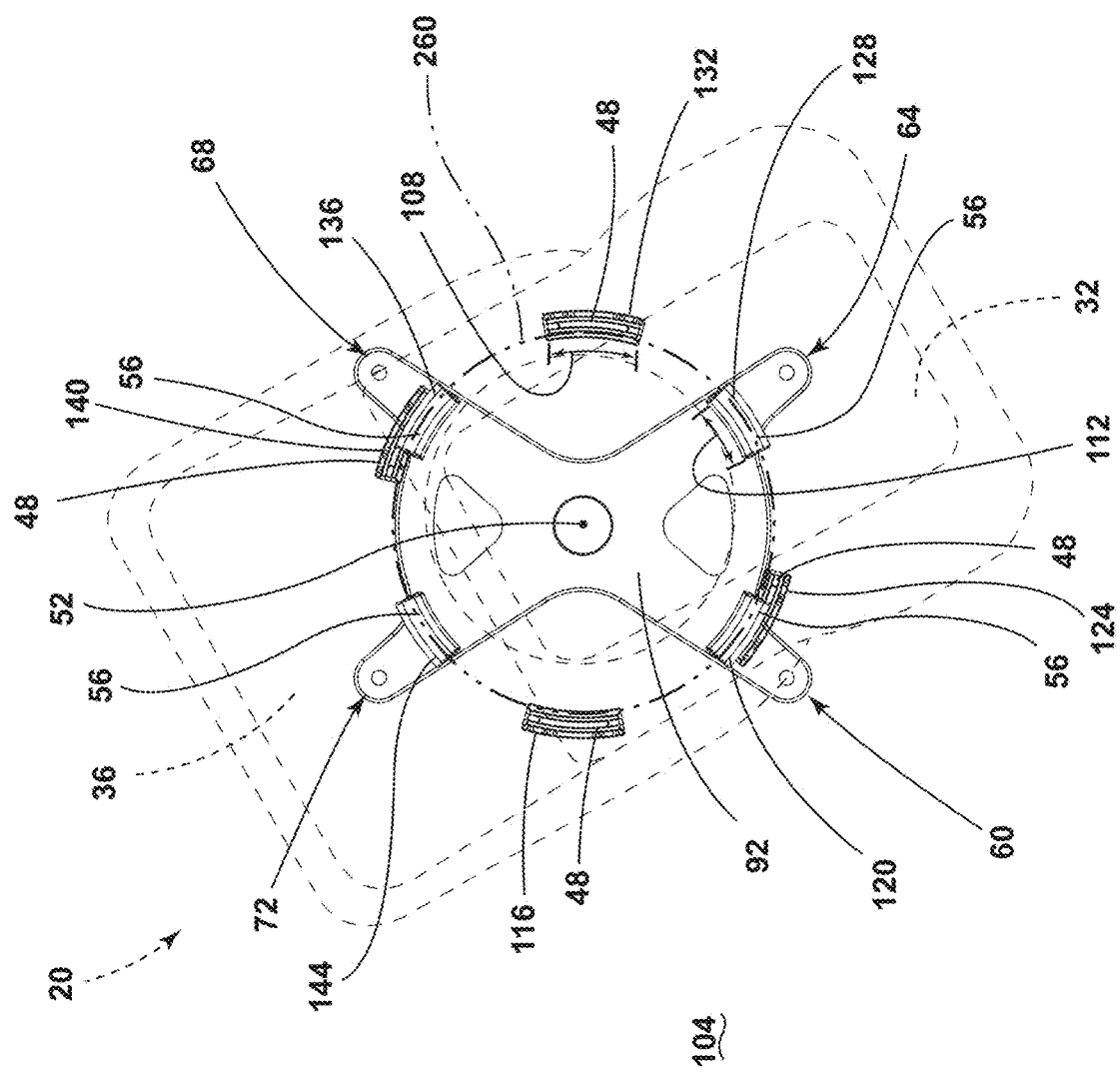
FIG. 6 is a top schematic view of the seating assembly, illustrating an interaction between the swivel anchors and the base anchors when the seating assembly is in a second diagonally-oriented position, according to one example.

Referring still further to FIGS. 3-6, in various ones of the diagonally-oriented positions, such as that depicted in FIG. 6, a first diagonal pair of the plurality of swivel anchors 48 may be engaged with a first diagonal pair of the plurality of base anchors 56. To aid in discussion, the plurality of swivel anchors 48 and the plurality of base anchors 56 will be given numerical assignments that are associated with the coupling depicted in the forward-facing position of FIG. 3. More specifically, in the forward-facing position, a first swivel anchor 116 may be associated with a first base anchor 120 that is positioned on the first leg 60. Additionally, a second swivel anchor 124 may be associated with a second base anchor 128 that is positioned on the second leg 64. Further, a third swivel anchor 132 may be associated with a third base anchor 136 that is positioned on the third leg 68. Still further, a fourth swivel anchor 140 may be associated with a fourth base anchor 144 that is positioned on the fourth leg 72. With the numerical frame of reference having been established with regard to the plurality of swivel anchors 48 and the plurality of base anchors 56, further discussion of the diagonally-oriented positions may now be undertaken.

Referring yet again to FIGS. 3-6, the first diagonal pair of the plurality of swivel anchors 48 may be the second swivel anchor 124 and the fourth swivel anchor 140, while the first diagonal pair of the plurality of base anchors 56 may be the first base anchor 120 and the third base anchor 136. More specifically, in the diagonally-oriented position depicted in FIG. 6, the second swivel anchor 124 may be associated with the first base anchor 120 and the fourth swivel anchor 140 may be associated with the third base anchor 136. In the diagonally-oriented position depicted in FIG. 6, the first swivel anchor 116 and the third swivel anchor 132 are not engaged with any of the plurality of base anchors 56. Similarly, in the diagonally-oriented position depicted in FIG. 6, the second base anchor 128 and the fourth base anchor 144 are free of engagement from any of the plurality of swivel anchors 48. Accordingly, when the seating assembly 20 is in the diagonally-oriented position depicted in FIG. 6, a second diagonal pair of the plurality of swivel anchors 48 (i.e., the first swivel anchor 116 and the third swivel anchor 132) are disengaged with a second diagonal pair of the plurality of base anchors 56 (i.e., the second base anchor 128 and the fourth base anchor 144). As is readily apparent, further rotation of the seating assembly 20 in a clockwise direction from the position depicted in FIG. 6 will result in an alternative pairing of engagement between diagonally oriented ones of the swivel anchors 48 and the diagonally oriented ones of the base anchors 56. For example, further rotation of the seating assembly 20 in the clockwise direction from the position depicted in FIG. 6 will, at some point, result in the first swivel anchor 116 engaging with the fourth base anchor 144 and the third swivel anchor 132 engaging with the second base anchor 128. In such a position, the first base anchor 120 and third base anchor 136 are free of engagement with any of the swivel anchors 48. Additionally, in such a position, the second swivel anchor 124 and the fourth swivel anchor 140 are free of engagement with any of the base anchors 56.

Figure 7:
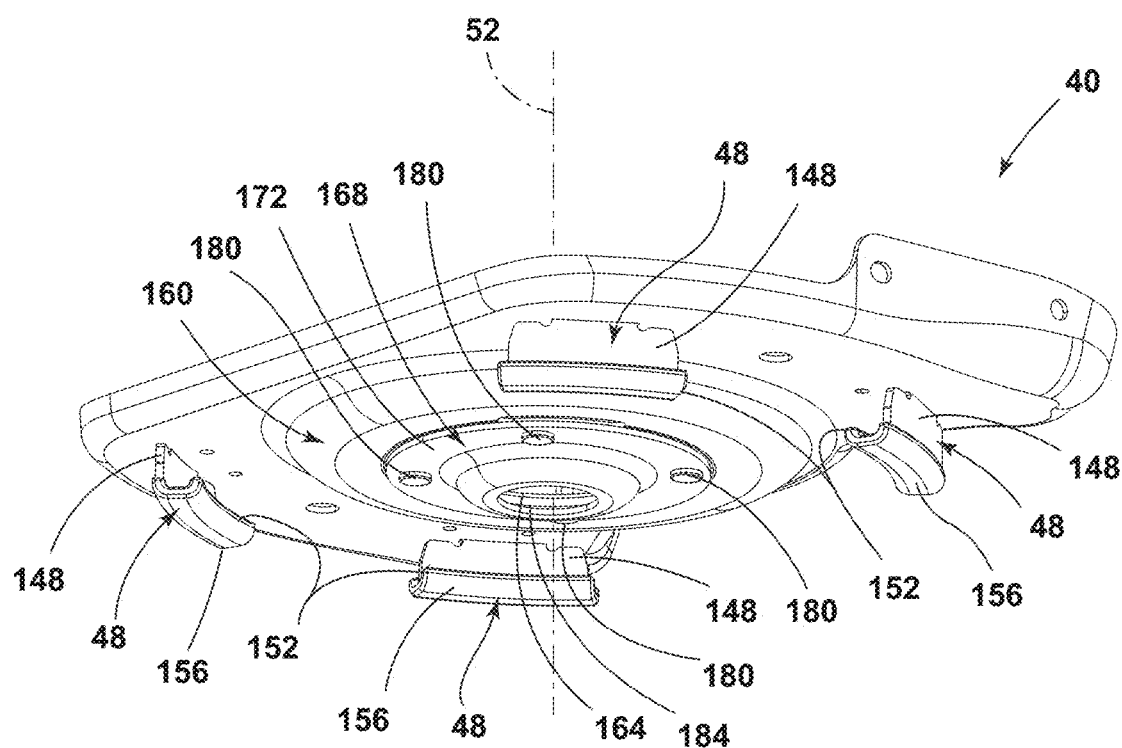
FIG. 7 is a bottom perspective view of the swivel plate, illustrating the swivel anchors thereof, according to one example.
Figure 8:
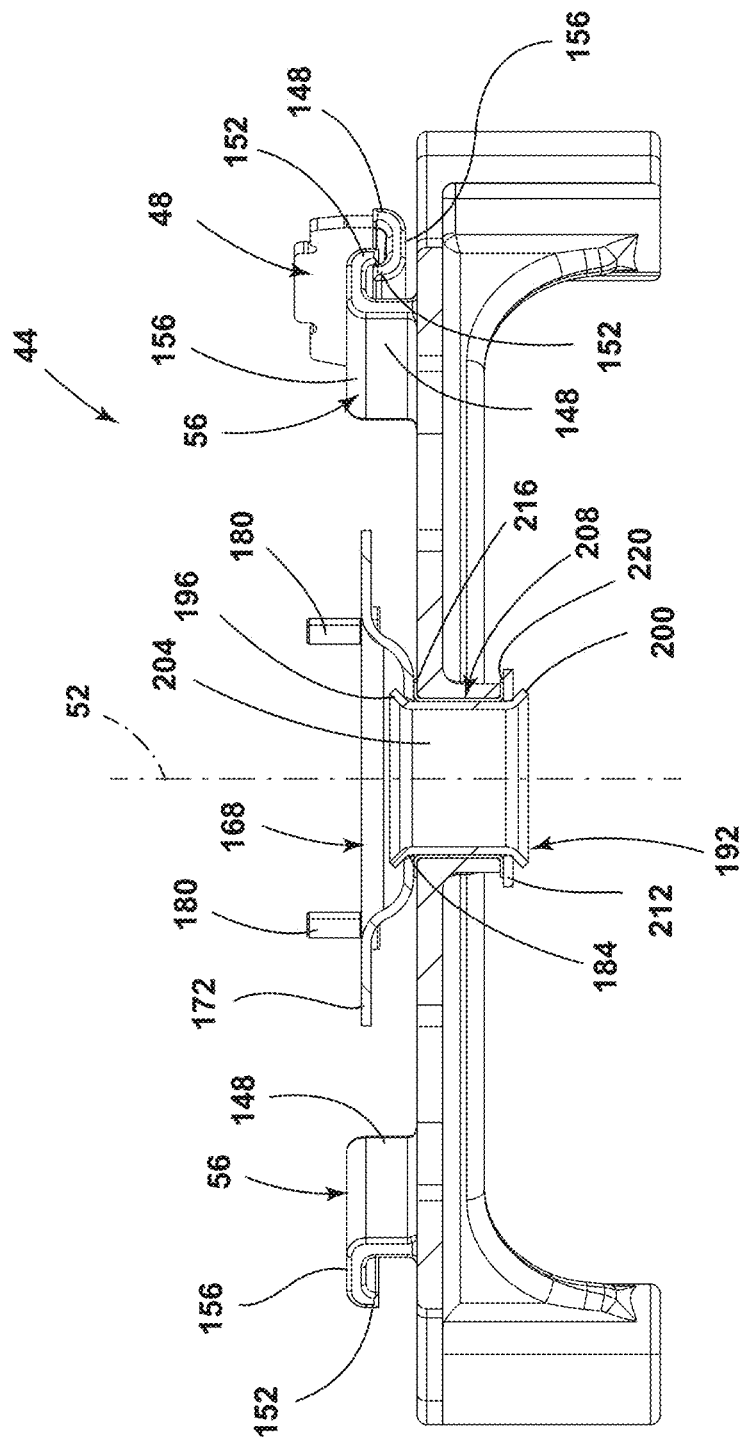
FIG. 8 is cross-sectional view of the base, taken along line VIII-VIII of FIG. 3, illustrating various components of the base, according to one example.
Figure 9:
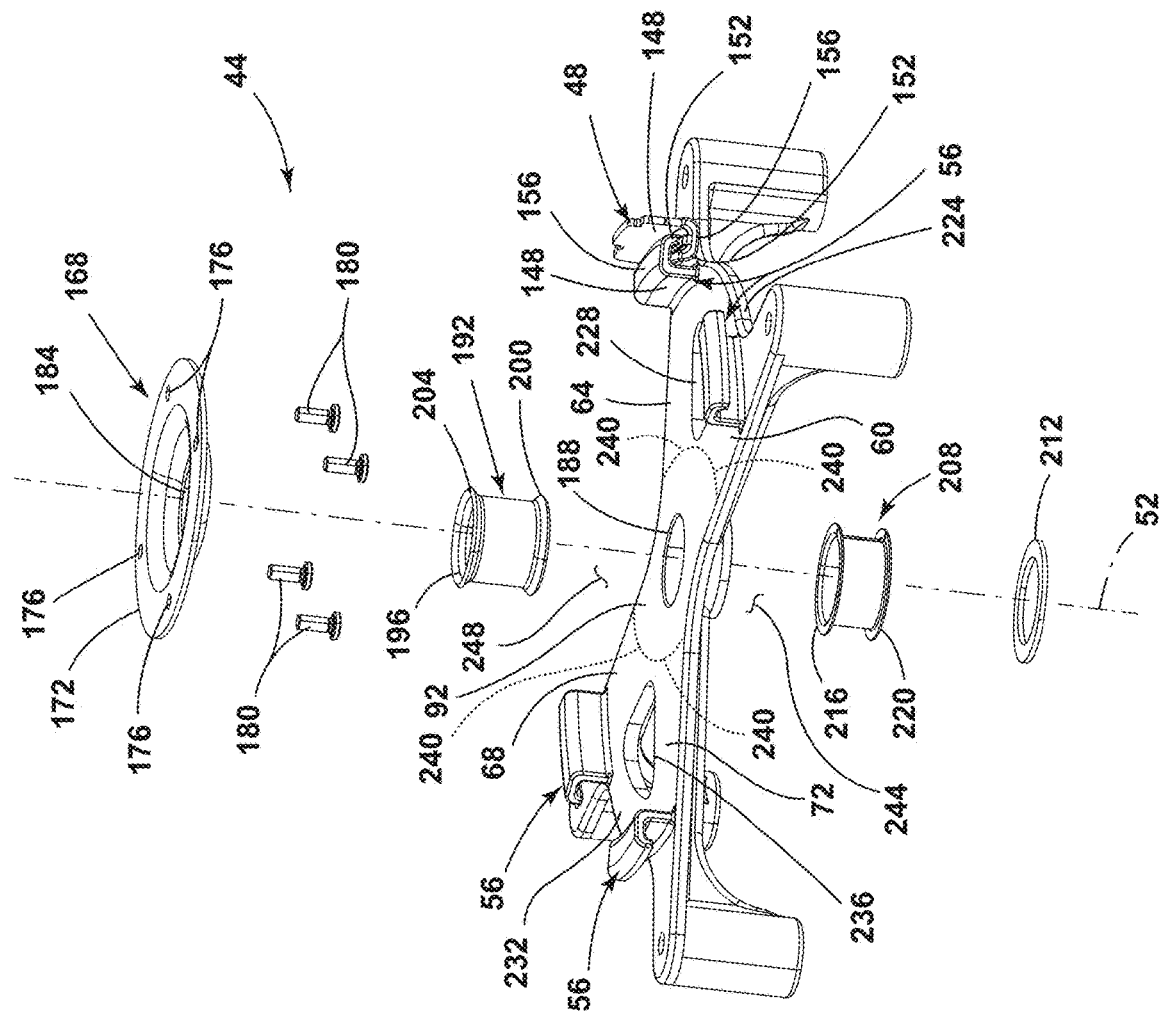
FIG. 9 is an exploded front perspective view of the base, illustrating the various components thereof, according to one example.

Referring now to FIGS. 7-9, each of the plurality of swivel anchors 48 and each of the plurality of base anchors 56 may be generally J-shaped. More specifically, each of the plurality of swivel anchors 48 may be arranged as inwardly facing J-shaped structures that extend downwardly from an underside of the swivel plate 40. Each of the plurality of base anchors 56 may have a profile that resembles an outwardly-facing, inverted J-shape that extends upwardly from an upper surface of the base 44. Each of the plurality of swivel anchors 48 and each of the plurality of base anchors 56 may include a major leg 148, a minor leg 152, and a trough 156 that extends between the major leg 148 and the minor leg 152. Engagement and/or retention of the swivel plate 40 to the base 44 may be accomplished by the interaction between the plurality of swivel anchors 48 and the plurality of base anchors 56, at least in part. For example, the troughs 156 of the base anchors 56 may receive the minor legs 152 of the swivel anchors 48. Similarly, the troughs 156 of the swivel anchors 48 may receive the minor legs 152 of the base anchors 56. Referring again to FIGS. 7-9, a central region 160 of the swivel plate 40 may be generally bowl-shaped such that the central region 160 protrudes downwardly from the underside of the swivel plate 40. Said another way, a surface of the underside of the swivel plate 40 in regions that are near a periphery of the swivel plate 40 may be generally planar with one another. As the central region 160 of the swivel plate 40 is approached, the surface of the underside of the swivel plate 40 may extend downwardly away from the plane defined by the surface of the underside of the swivel plate 40 in the regions that are near the periphery of the swivel plate 40. The contoured nature of the central region 160 of the swivel plate 40 can aid in providing clearance between the underside of the swivel plate 40 and the upper surface of the base 44. The clearance provided by the contour of the central region 160 may enable positioning of the plurality of swivel anchors 48 and the plurality of base anchors 56 in a manner that does not impede rotational motion of the seating assembly 20 about the vertical axis 52.

Referring further to FIGS. 7-9, the swivel plate 40 defines a plate aperture 164 within the central region 160. A rotation plate 168 can be employed to couple the swivel plate 40 to the base 44. The rotation plate 168 may have a complementary structure with regard to the central region 160 of the swivel plate 40. The rotation plate 168 can include a rotation flange 172 that defines one or more fastener apertures 176. The fastener apertures 176 of the rotation plate 168 can be spaced and configured to line up with corresponding fastener apertures provided in the central region 160 of the swivel plate 40. The one or more fastener apertures 176 may each receive a fastener 180 that extends through the rotation flange 172 and into the swivel plate 40 in a manner that retains the rotation plate 168 to the swivel plate 40. In various examples, the fasteners 180 may be, but are not limited to, rivets, bolts, or any other suitable fastener. The rotation plate 168 defines a rotation plate aperture 184. The rotation plate aperture 184 is sized and positioned to correspond with the plate aperture 164.

Referring still further to FIGS. 7-9, the base 44 defines a central aperture 188 within the central portion 92 of the base 44. A rotation shaft 192 extends through the central aperture 188 of the base 44. The rotation shaft 192 includes an upper retention flange 196 and a lower retention flange 200. When assembled, the upper retention flange 196 of the rotation shaft 192 extends through the rotation plate aperture 184 in a manner that retains the rotation shaft 192 to the rotation plate 168. For example, the upper retention flange 196 may have an outer diameter that is greater than a diameter of the rotation plate aperture 184. Similarly, an outer diameter of the lower retention flange 200 may be greater than a diameter of the central aperture 188 defined by the base 44. The rotation shaft 192 defines a shaft aperture 204 that aligns with the central aperture 188, the rotation plate aperture 184, and the plate aperture 164 when fully assembled. The plate aperture 164, the rotation plate aperture 184, the central aperture 188, and the shaft aperture 204, define a hollow pass-through for the seating assembly 20 that can be used for permitting and/or guiding electrical conduits (e.g., wiring harnesses) that extend between the seating assembly 20 and the track assembly of 80. Accordingly, power connections and/or data transfer connections may be established and maintained between the vehicle 22 and the seating assembly 20 without inhibiting rotation of the seating assembly 20 about the vertical axis 52.

Referring yet again to FIGS. 7-9, the upper retention flange 196 and the lower retention flange 200 may present a rounded surface to the electrical conduits extending through the shaft aperture 204 in an effort to avoid binding, nicking, entanglement, and/or damage that may otherwise occur to the electrical conduits extending therethrough. A bearing sleeve 208 may be positioned between an interior wall of the central aperture 188 and an exterior surface of the rotation shaft 192. The bearing sleeve 208 may decrease a frictional force that can oppose rotation of the seating assembly 20 about the vertical axis 52. A lock washer 212 may be positioned between an underside of the base 44 and the lower retention flange 200 of the rotation shaft 192. In various examples, the bearing sleeve 208 can include an upper bearing flange 216 and a lower bearing flange 220. The upper bearing flange 216 may be positioned between the upper surface of the base 44 and the lower surface of the rotation plate 168. The lower bearing flange 220 may be positioned between the underside of the base 44 and an upper surface of the lock washer 212. The lock washer 212 may retain the rotation shaft 192 in a desired vertical position relative to the base 44 and/or the rotation plate 168.

Referring further to FIGS. 7-9, the seating assembly 20 may be provided with an actuator (e.g., a motor) that is configured to enable powered rotational motion of the seating assembly about the vertical axis 52. For example, the actuator may be provided with a driveshaft extending from a housing of the actuator, with a gear positioned at a free end of the driveshaft. In such an arrangement, the gear may engage with teeth provided, for example, on the underside of the swivel plate 40. The teeth provided on the underside of the swivel plate 40 may extend to define a circle. For example, the teeth may be provided in the central region 160. In such an example, the actuator may be mounted to the base 44. For example, the actuator may be mounted on the first leg 60, the second leg 64, the third leg 68, the fourth leg 72, the first bracing member 224, and/or the second bracing member 232. In various example, the gear at the end of the driveshaft may engage with the teeth in a rack and pinion arrangement.

With specific reference to FIG. 9, a first bracing member 224 may extend between the first leg 60 and the second leg 64 such that a first lateral aperture 228 is defined by the base 44. A second bracing member 232 may extend between the third leg 68 and the fourth leg 72 such that a second lateral aperture 236 is defined by the base 44. The first and second lateral apertures 228, 236 can be positioned on either side of the central aperture 188. The first and second bracing members 224, 232 can provide resistance to deformation that may be experienced by the base 44 during regular use conditions. For example, the first and second bracing members 224, 232 can provide additional rigidity to the base 44 that can resist deformation associated with a user of the seating assembly 20 placing the seating assembly 20 in a reclined position while in the forward-facing position or the rearward-facing position. The first and second bracing members 224, 232 can also provide additional rigidity to the base 44 that can resist deformation associated with maneuvering of the vehicle 22 (e.g., acceleration, deceleration, cornering, etc.).

Referring again to FIG. 9, in some examples, each of the plurality of base anchors 56 may be positioned at an intermediate location along the length of one of the first leg 60, the second leg 64, the third leg 68, and the fourth leg 72. The intermediate location may be a point along each of the first leg 60, the second leg 64, the third leg 68, and the fourth leg 72 that is between the terminal ends 76 thereof and proximate ends 240 thereof. The proximate ends 240 are positioned radially inward from the terminal ends 76. The terminal ends 76 may be alternatively referred to as distal ends. The proximate ends 240 may be integrated with the central portion 92 such that there is not a discrete, or pronounced, transition between the central portion 92 and the proximate ends 240. Proximate and distal, as used herein, are intended to refer to relative positions of the ends of the first leg 60, the second leg 64, the third leg 68, and the fourth leg 72 in relation to a center point of the base 44. The vertical axis 52 extends through the center point of the base 44. Adjacent edges of the first leg 60, the second leg 64, the first bracing member 224, and/or the central portion 92 may define the first lateral aperture 228. Similarly, adjacent edges of the third leg 68, the fourth leg 72, the second bracing member 232, and/or the central portion 92 may define the second lateral aperture 236.

Referring to FIGS. 3 and 9, adjacent edges of the first leg 60, the fourth leg 72, and the central portion 92 may define a forward recess 244. Similarly, adjacent edges of the second leg 64, the third leg 68, and the central portion 92 may define a rearward recess 248. The forward recess 244 and the rearward recess 248 each have a generally triangular shape. More specifically, the forward recess 244 and the rearward recess 248 each have a generally open-faced triangular shape. That is, the forward recess 244 and the rearward recess 248 each have a generally triangular shape, where the generally triangular shape omits a leg of the triangle that extends between the terminal ends 76 of the given legs. An apex of the generally triangular shape of the forward recess 244 can be located at, or near, a forward inflection point 252 on the central portion 92 between the first leg 60 and the fourth leg 72. Similarly, an apex of the generally triangular shape of the rearward recess 248 can be located at, or near, a rearward inflection point 256 on the central portion between the second leg 64 and the third leg 68. The leg of the generally triangular shape that is omitted may be opposite to the apexes located at, or near, the forward inflection point 252 and the rearward inflection point 256.

Referring again to FIGS. 3 and 9, the generally triangular shapes of the forward recess 244 and the rearward recess 248 may be defined, at least in part, by an obtuse angle located at the forward inflection point 252 and the rearward inflection point 256, respectively. The obtuse angle located at the forward inflection point 252 and the rearward inflection 256 may be at least about one-hundred degrees (100°), at least about one-hundred-ten degrees (110°), at least about one-hundred-twenty degrees (120°), at least about one-hundred-thirty degrees (130°), at least about one-hundred-forty degrees (140°), at least about one-hundred-fifty degrees (150°), at least about one-hundred-sixty degrees (160°), at least about one-hundred-seventy degrees (170°), less than one-hundred-eighty degrees (180°), and/or combinations or ranges thereof.

Referring further to FIGS. 3 and 9, the forward inflection point 252 and the rearward inflection point 256 are each positioned radially inward of a travel path 260 of the plurality of swivel anchors 48. In various examples, a line extending between the forward inflection point 252 and the rearward inflection point 256 may represent the smallest distance across the base 44. The forward recess 244 can provide a space for feet of an occupant sitting in the seating assembly 20 when the seating assembly 20 is in the forward-facing position. Similarly, the rearward recess 248 can provide a space for feet of an occupant sitting in the seating assembly 20 when the seating assembly 20 is in the rearward-facing position. Additionally, or alternatively, the forward recess 244 and/or the rearward recess 248 may be used by an occupant of an immediately adjacent seating assembly as a region of the passenger compartment 24 to place their feet. Accordingly, the forward recess 244 and/or the rearward recess 248 may increase an effective leg room for a variety of occupants of the passenger compartment 24.

Referring still further to FIGS. 3 and 9, the forward recess 244 and/or the rearward recess 248 may additionally, or alternatively, provide an increase in cargo space within the passenger compartment 24. For example, the forward recess 244 and/or the rearward recess 248 may provide additional storage space for cargo items, with the storage space being located on the floor 88 below the seating assembly 20. In examples where a plurality of the seating assemblies 20 are coupled to the same pair of the track assemblies 80, the forward and rearward recesses 244, 248 can enable stowing the plurality of seating assemblies 20 within a smaller surface area of the passenger compartment 24. For example, the plurality of seating assemblies 20 that are coupled to the same pair of the track assemblies 80 can each rotate the seat 32 thereof in an upward direction to assume a vertically-stowed position as a result of the pivotable coupling to the coupling member 28. Once the seats 32 are in the vertically-stowed position, the seats 32 are somewhat parallel to the associated seatback 36 such that cushions of the seats 32 and the seatbacks 36 are in a generally abutting relationship. With the seats 32 in the vertically-stowed position, the seating assemblies 20 may be actuated along the pair of track assemblies 80 that are shared and into a more space-efficient footprint as a result, at least in part, of the forward recess 244 and/or the rearward recess 248.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A seating assembly, comprising:
   a coupling member;
   a seat pivotably coupled to the coupling member;
   a seatback pivotably coupled to the coupling member;
   a swivel plate coupled to the coupling member, wherein the swivel plate enables rotational movement of the coupling member, the seat, and the seatback about a vertical axis, and wherein the swivel plate comprises a plurality of swivel anchors;
   a base coupled to the swivel plate, wherein the base comprises:
      a) a central aperture;
      b) a geometrical center defining a center point through which the vertical axis extends;
      c) a first leg, a second leg, a third leg, and a fourth leg, wherein each leg comprises a terminal end, the terminal ends configured to substantially extend horizontally outward from the center of the base;
      d) a first foot, a second foot, a third foot, and a fourth foot, wherein each foot is coupled to the terminal end of their respective leg; and
      e) a plurality of base anchors; and
   a rotation shaft coupled to the central aperture, wherein the rotation shaft comprises;
      a) an upper retention flange, wherein the upper retention flange extends through a rotation plate aperture defined by the rotation plate and has an outer diameter that is greater than a diameter of the rotation plate aperture; and
      b) a lower retention flange, wherein the lower retention flange is positioned beneath an underside of the base, wherein the lower retention flange has an outer diameter that is greater than a diameter of the central aperture.

2. The seating assembly of claim 1, wherein each of the plurality of swivel anchors is received in one of the plurality of base anchors when the seating assembly is in a forward-facing position.

3. The seating assembly of claim 2, wherein each of the plurality of swivel anchors is received in one of the plurality of base anchors when the seating assembly is in a rearward-facing position.

4. The seating assembly of claim 3, wherein a surface area of overlap between the plurality of swivel anchors and the plurality of base anchors is greater in the forward- and rear-facing positions than a side-facing position.

5. The seating assembly of claim 4, wherein the plurality of swivel anchors are free of engagement with the plurality of base anchors when the seating assembly is in the side-facing position.

6. The seating assembly of claim 4, wherein, when the seating assembly is in a diagonally-oriented position:
   a first diagonal pair of the plurality of swivel anchors is engaged with a first diagonal pair of the plurality of base anchors; and
   a second diagonal pair of the plurality of swivel anchors is disengaged with a second diagonal pair of the plurality of base anchors.

7. The seating assembly of claim 6, wherein the diagonally-oriented position is at least one intermediate position chosen from between the forward-facing position and the side-facing position and between the rearward-facing position and the side-facing position.

8. The seating assembly of claim 1, wherein each foot is configured to extend downward with respect to the vertical axis toward at least one track assembly.

9. The seating assembly of claim 8, wherein the first foot, the second foot, the third foot, and the fourth foot are each configured for engagement with the at least one track assembly.

10. The seating assembly of claim 9, wherein the at least one track assembly comprises a first track assembly and a second track assembly, wherein the first foot and the second foot are configured for engagement with the first track assembly, and wherein the third foot and the fourth foot are configured for engagement with the second track assembly.

11. The seating assembly of claim 1, wherein a central region of the swivel plate has a bowl-shaped profile.

12. The seating assembly of claim 11, wherein the bowl-shaped profile is configured to provide sufficient clearance between the swivel plate and the base.

13. The seating assembly of claim 1, wherein the base has a profile that is generally X-shaped.

14. A vehicle seating assembly, comprising:
   a coupling member;
   a seat pivotably coupled to the coupling member;
   a seatback pivotably coupled to the coupling member;
   a swivel plate coupled to the coupling member, wherein the swivel plate enables rotational movement of the coupling member, the seat, and the seatback about a vertical axis, and wherein the swivel plate comprises a plurality of swivel anchors;
   a rotation plate coupled to the swivel plate; and
   a base coupled to the swivel plate, wherein the base comprises:
      a) a central region defining a central aperture;
      b) a first leg, a second leg, a third leg, and a fourth leg, wherein each leg comprises a terminal end configured to substantially extend horizontally outward from the central region of the base;
      c) a first foot, a second foot, a third foot, and a fourth foot, wherein each foot is coupled to the terminal end of their respective leg, and wherein each foot is configured to be coupled to a rail system in a vehicle; and
      d) a plurality of base anchors, wherein the plurality of base anchors receive the plurality of swivel anchors, wherein each of the plurality of swivel anchors is received in one of the plurality of base anchors when the vehicle seating assembly is in a forward-facing position, wherein each of the plurality of swivel anchors is received in one of the plurality of base anchors when the vehicle seating assembly is in a rearward-facing position, wherein a surface area of overlap between the plurality of swivel anchors and the plurality of base anchors is greater in the forward-facing position than a side-facing position, and wherein the surface area of overlap between the plurality of swivel anchors and the plurality of base anchors is greater in the rearward-facing position than the side-facing position; and
   a rotation shaft coupled to the central aperture, wherein the rotation shaft comprises:
      a) an upper retention flange, wherein the upper retention flange extends through a rotation plate aperture defined by the rotation plate and has an outer diameter that is greater than a diameter of the rotation plate aperture; and b) a lower retention flange, wherein the lower retention flange is positioned beneath an underside of the base, wherein the lower retention flange has an outer diameter that is greater than a diameter of the central aperture.

15. The vehicle seating assembly of claim 14, wherein the plurality of swivel anchors are free of engagement with the plurality of base anchors when the vehicle seating assembly is in the side-facing position.

16. The vehicle seating assembly of claim 14, wherein, when the seating assembly is in a diagonally-oriented position, a first diagonal pair of the plurality of swivel anchors is engaged with a first diagonal pair of the plurality of base anchors, wherein, when the seating assembly is in the diagonally-oriented position, a second diagonal pair of the plurality of swivel anchors is disengaged with a second diagonal pair of the plurality of base anchors, wherein the diagonally-oriented position is at least one intermediate position chosen from between the forward-facing position and the side-facing position and between the rearward-facing position and the side-facing position.

17. The vehicle seating assembly of claim 14, wherein the base has a profile that is generally X-shaped wherein the profile of the base further comprises:
 a forward inflection point; and
 a rearward inflection point, wherein a line extending between the forward inflection point and the rearward inflection point represents a smallest distance across the base.

18. The seating assembly of claim 14, wherein the rail system in the vehicle comprises a first rail and a second rail, wherein the first foot and the second foot are configured to be coupled to the first rail, and wherein the third foot and the fourth foot are configured to be coupled to the second rail.

19. The seating assembly of claim 14, further comprising:
 a plate aperture located in the central region of the plate, wherein the plate aperture is configured to complement the central aperture of the base; and
 a hollow cavity defined by the central aperture and plate aperture.

\* \* \* \* \*